(12) United States Patent
Rogahn et al.

(10) Patent No.: US 7,771,888 B2
(45) Date of Patent: Aug. 10, 2010

(54) ANODE AIR PURGE VALVE DESIGN

(75) Inventors: Aaron Rogahn, Rochester, NY (US); Bruce J. Clingerman, Palmyra, NY (US); Joseph Gerzseny, Spencerport, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 730 days.

(21) Appl. No.: 11/625,261

(22) Filed: Jan. 19, 2007

(65) Prior Publication Data

US 2008/0176127 A1 Jul. 24, 2008

(51) Int. Cl.
- H01M 2/00 (2006.01)
- F16K 31/02 (2006.01)
- F16K 7/00 (2006.01)
- F16K 11/14 (2006.01)

(52) U.S. Cl. .............. 429/512; 251/129.07; 137/863; 137/870

(58) Field of Classification Search .......... 137/863
See application file for complete search history.

(56) References Cited

U.S. PATENT DOCUMENTS

| | | | |
|---|---|---|---|
| 6,328,279 B1 * | 12/2001 | Adkins et al. | 251/129.07 |
| 6,475,658 B1 * | 11/2002 | Pedicini et al. | 429/34 |
| 2006/0040150 A1 * | 2/2006 | Yu et al. | 429/13 |
| 2007/0184315 A1 * | 8/2007 | Kelly et al. | 429/23 |

* cited by examiner

*Primary Examiner*—Patrick Ryan
*Assistant Examiner*—Ashley Kwon
(74) *Attorney, Agent, or Firm*—John A. Miller; Miller IP Group, PLC

(57) ABSTRACT

A purge valve for a split fuel cell stack design that prevents a direct flow path between the anode sides of the split stacks. The purge valve includes an inlet port that receives purge air from a compressor, a first outlet port in fluid communication with the anode side of one of the split stacks and a second outlet port in fluid communication with the anode side of the other split stack. A spring biased shaft maintains a diaphragm in a closed position to close off the flow channels between the inlet port and the first outlet port, the inlet port and the second outlet port and the first and second outlet ports during normal fuel cell operation. A hole is provided through the diaphragm to provide pressure equalization in the chamber.

10 Claims, 2 Drawing Sheets

ANODE AIR PURGE VALVE DESIGN

BACKGROUND OF THE INVENTION

1. Field of the Invention

This invention relates generally to an anode purge valve for a fuel cell stack and, more particularly, to a single anode purge valve for a split fuel cell stack, where the purge valve is positioned between the split stacks.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For example, a typical fuel cell stack for a vehicle may have two hundred or more stacked fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

For automotive applications, it typically takes about 400 fuel cells to provide the desired power. Because so many fuel cells are required for the stack in automotive fuel cell system designs, the stack is sometimes split into two sub-stacks each including about 200 fuel cells because it is difficult to effectively provide an equal flow of hydrogen gas through 400 fuel cells in parallel.

Also, the membrane within a fuel cell needs to have a certain relative humidity so that the ionic resistance across the membrane is low enough to effectively conduct protons. This humidification may come from the stack water by-product or external humidification. The flow of hydrogen through the anode gas flow channels has a drying effect on the membrane, most noticeably at an inlet of the hydrogen flow. Also, the accumulation of water droplets within the anode gas flow channels from the membrane relative humidity and water by-product could prevent hydrogen from flowing therethrough, and cause the cell to fail because of low reactant gas flow, thus affecting the stack stability. The accumulation of water in the reactant gas flow channels is particularly troublesome at low stack output loads.

It may be desirable in certain fuel cell system designs to purge the anode side of the fuel cell stack at system shut-down with air from the compressor to remove the remaining hydrogen and water in the flow channels in the anode side of the stack. Removing the hydrogen from the anode side at system shut-down has certain well-known benefits, and removing the water from the flow channels prevents it from freezing in the stack in low temperature environments.

Traditionally, for a split fuel cell stack design, there is a separate anode purge valve for both split stacks positioned between the stacks to provide the compressor air to the anode channels at system shut-down. It has been proposed in the art to eliminate one of the valves and provide a single valve having a single output directed to both split stacks. However, with a single valve purge system, there is a flow link between the anode side of the split stacks through the single purge valve that affects system performance during normal fuel cell stack operation. Therefore, it would be beneficial to provide a single purge valve for a split stack design that was appropriately sized for the size the system, and eliminated the flow path through the valve to the anode sides of the split stacks.

SUMMARY OF THE INVENTION

In accordance with the teachings of the present invention, a purge valve for a split fuel cell stack design is disclosed that prevents a direct flow path between the anode side of the split stacks. The purge valve includes an inlet port that receives purge air from a compressor, a first outlet port in fluid communication with the anode side of one of the split stacks and a second outlet port in fluid communication with the anode side of the other split stack. A spring biased shaft maintains a diaphragm in a closed position to close off the flow channels between the inlet port and the first outlet port, the inlet port and the second outlet port and the first and second outlet ports during normal fuel cell operation. A hole is provided through the diaphragm to provide pressure equalization. During the stack purge, an electromagnetic coil draws the shaft away from the diaphragm so that compressor air is forced through the valve to the anode side of both stacks.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a single purge valve for a split fuel cell stack is merely exemplary in nature, and is in no way intended to limit the invention or its applications or uses.

Figure 1:
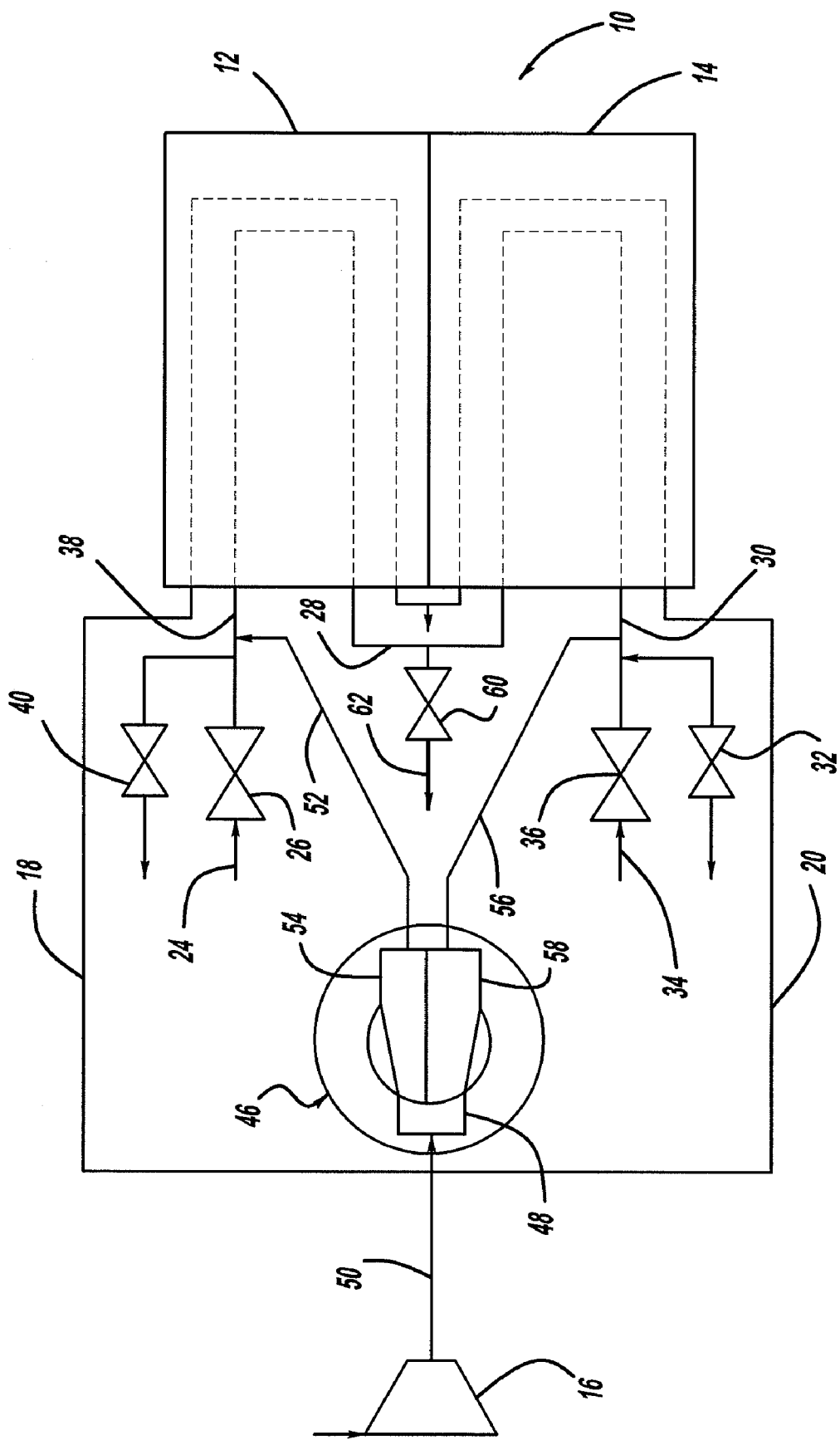
FIG. 1 is a plan view of a fuel cell system including a split fuel cell stack and a single anode purge valve, according to an embodiment of the present invention.

FIG. 1 is a plan view of a fuel cell system 10 including a split fuel cell stack having a first split stack 12 and a second split stack 14. In this embodiment, the split stacks 12 and 14 provide anode reactant gas flow-shifting, where the direction of the anode gas flow through the stack is periodically reversed so that the drying effect from dry hydrogen at the anode side inlet does not continually happen at one end of the stack. Further, by providing flow-shifting, the water produced by the stack is better used to provide humidification of the membranes.

The system 10 includes a compressor 16 that provides cathode air to the cathode side of the split stacks 12 and 14 on lines 18 and 20. In one flow direction, fresh hydrogen reactant gas is provided to the split stack 12 on line 24 through injector valve 26. The hydrogen reactant gas exits the split stack 12 on line 28, and enters the split stack 14. The hydrogen reactant gas flow from the split stack 14 may or may not be bled through a bleed valve 32. In the opposite flow direction, fresh hydrogen reactant gas is provided to the split stack 14 on line 30 through an injector valve 34. The hydrogen reactant gas flow exits the split stack 14 on the line 28 and enters the split stack 12. The hydrogen reactant gas flow exits the split stack 12 on line 38, and may or may not be bled through a bleed valve 40.

According to the invention, a single purge valve 46 is provided to purge the anode side of both of the split stacks 12 and 14 at system shut-down to remove hydrogen and water therefrom. Purge air from the compressor 16 is sent to an inlet port 48 of the purge valve 26 on line 50. The purge air is split in the valve 46 so purge air is provided to output line 52 through outlet port 54 that is coupled to the anode side of the split stack 12, and purge air is provided to output line 56 through outlet port 58 that is coupled to the anode side of the split stack 14. The purge air and the purged water from the split stacks 12 and 14 is exhausted from the split stacks 12 and 14 through outlet valve 60 on line 62.

Figure 2:
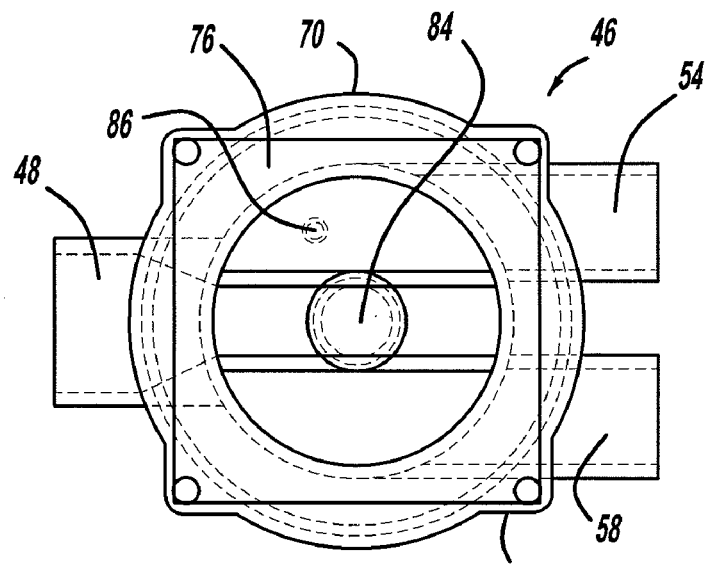
FIG. 2 is a top view of the purge valve shown in FIG. 1 separated from the fuel cell system.
Figure 3:
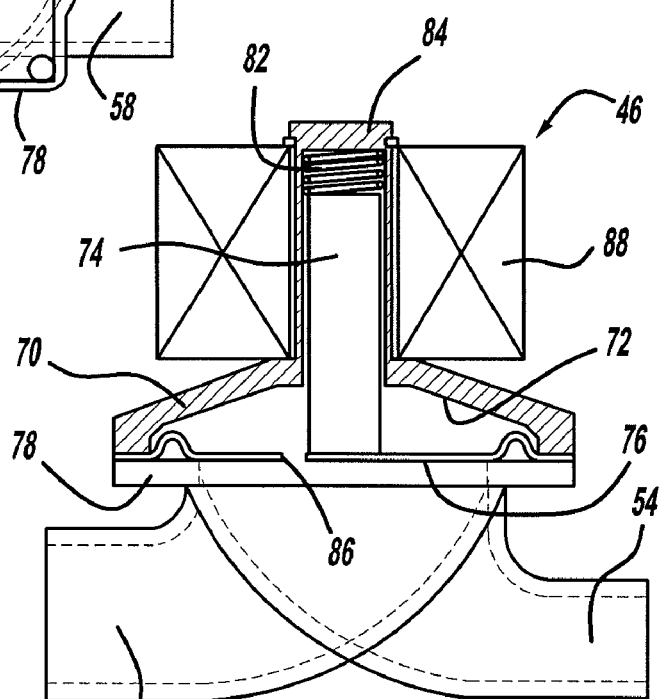
FIG. 3 is a cross-sectional side view of the purge valve shown in FIG. 1 separated from the fuel cell system.
Figure 4:
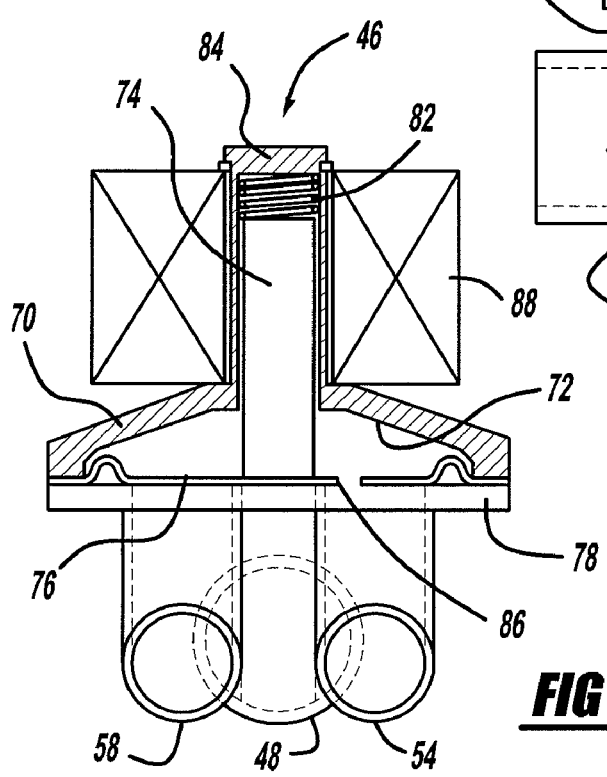
FIG. 4 is a cross-sectional front view of the purge valve shown in FIG. 1, separated from the fuel cell system.

FIG. 2 is a top view, FIG. 3 is a cross-sectional side view and FIG. 4 is a cross-sectional front view of the purge valve 46 removed from the system 10. The purge valve 46 includes a conical shaped housing 70 defining a chamber 72 therein. A rod 74 extends through a central opening in the housing 70 into the chamber 72. A diaphragm 76 is provided across the bottom portion of the housing 70 to close the chamber 72. The diaphragm 76 is secured to a square plate 78 having a central opening so that edges of the diaphragm 76 are mounted between the plate 78 and the housing 70, as shown. In one embodiment, the plate 78 is gimbaled to the rod 74 to allow for a good mating with typical machine tolerances.

The valve 46 is shown in the closed position in FIGS. 2 and 3. A spring 82 is positioned between a spring stop 84 and the rod 74. The bias of the spring 82 pushes the rod 74 against the diaphragm 76 to close the flow channels between the inlet port 48 and the outlet port 54, the inlet port 48 and the outlet port 58, and the outlet ports 54 and 58. The chamber 72 is in fluid communication with the outlet ports 54 and 58 when the diaphragm 76 is in the closed position. A hole 86 is provided through the diaphragm 76 and acts as a pressure equalizer between the chamber 72 and the force of the air from the compressor 16 when the diaphragm 76 is in the closed position. Thus, the bias of the spring 82 does not need to be too robust to hold the diaphragm 76 in the closed position against the compressor air. During normal fuel cell operation, the anode pressure is higher than the cathode pressure, so that the delta pressure across the diaphragm 52 helps hold the valve 46 in the closed position in combination with the spring bias. At shut down, the anode pressure drops.

During the anode purge of the split stacks 12 and 14, a current signal is provided to an electromagnetic coil 88 where the magnetic field provided by the current flow interacts with the rod 74 to draw it away from the diaphragm 76. The coil 88 is not shown in FIG. 2 for clarity purposes. The pressure of the purge air from the compressor 16 at the inlet port 48 pushes the diaphragm 76 into the chamber 72 which opens the flow channels in the valve 46 so that air flows through the valve 46 and out the outlet ports 54 and 58 to provide the purge.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A purge valve for a fuel cell stack, said valve comprising:
a housing defining a chamber;
an inlet port in fluid communication with the chamber;
a first outlet port in fluid communication with the chamber;
a second outlet port in fluid communication with the chamber;
a diaphragm positioned in the chamber and operating to close off flow between the inlet port and the first and second outlet ports when the diaphragm is in a first position, and to allow flow between the inlet port and the first and second outlet ports when the diaphragm is in a second position, said diaphragm including a hole between the chamber and the outlet ports that provides pressure equalization between the inlet port and the chamber when the diaphragm is closed.

2. The valve according to claim 1 further comprising a spring, a shaft and an electromagnetic coil, said shaft extending through the housing and being positioned in contact with the diaphragm with the bias of the spring, said electromagnetic coil being energized to move the shaft against the bias of the spring to open the valve and provide a flow channel between the inlet port and the first and second outlet ports.

3. The valve according to claim 1 wherein the fuel cell stack is a split fuel cell stack, wherein the first outlet port is in fluid communication with the anode side of one of the split stacks and the second outlet port is in fluid communication with the anode side of the other split stack.

4. The valve according to claim 1 wherein the inlet port receives purge air from a compressor.

5. The valve according to claim 1 wherein the fuel cell stack is part of a fuel cell system on a vehicle.

6. A fuel cell system comprising:
a first split stack including an anode input line;
a second split stack including an anode input line;
a coupling line coupling the anode side of the first and the anode side of the second split stack; and
a purge valve for purging the anode side of the first and second split stacks at system shut-down, said purge valve including a housing defining a chamber, an inlet port, a first outlet port in fluid communication with the chamber and the anode input line of the first split stack, a second outlet port in fluid communication with the chamber and the anode input line of the second split stack, and a diaphragm positioned within the chamber, said diaphragm closing off a flow between the inlet port and the first and second outlet ports when the diaphragm is in a closed position, and allowing flow through the purge valve from the inlet port to the anode input line of the first split stack and the anode input line of the second split stack when the diaphragm is in an open position at system shut-down.

7. The system according to claim 6 further comprising a compressor, said compressor providing air to a cathode side of the first and second split stacks, and providing purge air to the inlet port of the purge valve.

8. The system according to claim 6 wherein the diaphragm includes a hole between the chamber and the outlet ports that provides pressure equalization between the inlet port and the chamber when the diaphragm is closed.

9. The system according to claim 6 wherein the valve further includes a spring, a shaft and an electromagnetic coil, said shaft extending through the housing and being positioned in contact with the diaphragm with the bias of the spring, said electromagnetic coil being energized to move the shaft against the bias of the spring to open the valve and provide a flow channel between the inlet port and the first and second outlet ports.

10. The system according to claim 6 wherein the fuel cell system is on a vehicle.

* * * * *